US009148789B2

(12) United States Patent
Hulkkonen et al.

(10) Patent No.: US 9,148,789 B2
(45) Date of Patent: Sep. 29, 2015

(54) INTER-SYSTEM INTERFERENCE CONTROL

(75) Inventors: Jari Yrjänä Hulkkonen, Oulu (FI); Esa Tapani Tiirola, Kempele (FI); Mikko Säily, Sipoo (FI); Kari Pekka Pajukoski, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 988 days.

(21) Appl. No.: 12/743,343

(22) PCT Filed: Nov. 28, 2008

(86) PCT No.: PCT/FI2008/000135
§ 371 (c)(1),
(2), (4) Date: May 17, 2010

(87) PCT Pub. No.: WO2009/068727
PCT Pub. Date: Jun. 4, 2009

(65) Prior Publication Data

US 2010/0248736 A1 Sep. 30, 2010

(30) Foreign Application Priority Data

Nov. 30, 2007 (FI) ..................................... 20075859

(51) Int. Cl.
*H04B 17/345* (2015.01)
*H04W 16/14* (2009.01)
(Continued)

(52) U.S. Cl.
CPC ............ *H04W 16/14* (2013.01); *H04B 17/345* (2015.01); *H04W 52/243* (2013.01)

(58) Field of Classification Search
CPC .................................................... H04B 17/345
USPC ............... 455/62, 63.1, 67.13, 443, 446, 447, 455/448, 442.1, 449, 450, 452.1, 456.5, 455/464, 509
See application file for complete search history.

(56) References Cited

U.S. PATENT DOCUMENTS 5,649,303 A * 7/1997 Hess et al. ................... 455/63.3
5,950,136 A * 9/1999 Scott .......................... 455/452.1

(Continued)

FOREIGN PATENT DOCUMENTS

CN 1810060 7/2006
CN 1930899 3/2007

(Continued)

OTHER PUBLICATIONS

Search Report and Written Opinion mailed Mar. 19, 2009, for corresponding PCT Application No. PCT/FI2008/000135 filed Nov. 28, 2008, 14 pages.

(Continued)

*Primary Examiner* — Andrew Wendell
*Assistant Examiner* — Cindy Trandai
(74) *Attorney, Agent, or Firm* — Squire Patton Boggs (US) LLP

(57) ABSTRACT

It is provided a solution for controlling interference in a cellular telecommunication system. An interference controller of the cellular telecommunication utilizes interference level information received from another cellular telecommunication system in controlling interference towards a target cell suffering from high interference which degrades the grade of service in the target cell. The interference level information comprises information on levels of interference between neighboring cells of the other cellular telecommunication system. The interference controller analyzes the received interference level information and controls communication links in cells of the cellular telecommunication system determined to cause the highest interference towards the target cell. The cells determined to cause the highest interference towards the target cell are determined from the received interference level information.

20 Claims, 3 Drawing Sheets

112
200 TX/RX — 202 CNTL — 204 I/O — 206 I/O — 208 CNTL — 210 I/O
212 TX/RX — 214 CNTL — 216 I/O — 218 I/O — 220 CNTL — 222 I/O

(51) Int. Cl.
*H04W 28/16* (2009.01)
*H04W 52/24* (2009.01)

(56) References Cited

U.S. PATENT DOCUMENTS

| | | | | |
|---|---|---|---|---|
| 7,136,638 | B2 | 11/2006 | Wacker et al. | |
| 7,146,133 | B2 | 12/2006 | Bahl et al. | |
| 2002/0111163 | A1 * | 8/2002 | Hamabe | 455/425 |
| 2004/0072751 | A1 * | 4/2004 | Halonen et al. | 455/450 |
| 2004/0242158 | A1 * | 12/2004 | Fattouch et al. | 455/63.1 |
| 2006/0240777 | A1 | 10/2006 | Ruuska et al. | |
| 2009/0163210 | A1 * | 6/2009 | Abedi et al. | 455/436 |
| 2009/0163215 | A1 * | 6/2009 | Abedi | 455/446 |

FOREIGN PATENT DOCUMENTS

| | | | |
|---|---|---|---|
| EP | 1494490 | A1 | 5/2005 |
| EP | 1633053 | A1 | 3/2006 |
| EP | 1667373 | A1 | 6/2006 |
| EP | 1732338 | A1 | 12/2006 |
| WO | 2008142529 | A2 | 11/2008 |

OTHER PUBLICATIONS

Office Action issued Jun. 7, 2013 in corresponding CN patent application No. 200880118199.0 (with English translation).

European Search Report dated Mar. 17, 2014 corresponding to European Patent Application No. 08855340.9.

Chinese Office Action dated May 30, 2014 corresponding to Chinese Patent Application No. 200880118199.0.

Notification of Third Office Action dated Dec. 4, 2013 corresponding to Chinese Patent Application No. 200880118199.0 and English translation thereof.

* cited by examiner

INTER-SYSTEM INTERFERENCE CONTROL

RELATED APPLICATION

This application was originally filed as PCT Application No. PCT/FI2008/000135 filed Nov. 28, 2008, which claims priority to Finland Application No. 20075859 filed Nov. 30, 2007.

FIELD

The invention relates to the field of cellular radio telecommunications and, particularly, to controlling inter-system interference between cellular telecommunication systems sharing the same radio resources.

BACKGROUND

Due to an increase in the number of cellular telecommunication systems because of upcoming next generation cellular telecommunication systems, two cellular telecommunication systems may have to be allocated to share at least partly the same radio resources, e.g. frequency. For example, if an operator cannot acquire new frequency spectrum to operate a new evolution of the third generation cellular telecommunication system, the new cellular telecommunication system has to be allocated to share the same frequency band with a current second generation cellular telecommunication system, such as GSM (Global System for Mobile Communications). For example, GSM typically uses a frequency reuse factor of three or higher and, therefore, frequency resources may be allocated to the GSM cells such that neighboring cells do not use the same frequency band. The new evolution of the third generation cellular telecommunication system may, however, be configured to use a frequency reuse factor of one, i.e. to use the same or overlapping frequency bands in all cells, which results in interference between the two cellular telecommunication systems. Accordingly, there is a need for controlling the interference to avoid losses in quality of service in the cellular telecommunication systems.

BRIEF DESCRIPTION

According to an aspect of the present invention, a method, comprising: receiving, from a first cellular telecommunication system in an interference controller of a second cellular telecommunication system, interference level information, the interference level information describing levels of interference between neighboring cells of the first cellular telecommunication system; and utilizing, by the interference controller, the received interference level information in interference control, wherein communication links in the second cellular telecommunication system are controlled so as to control interference towards a target cell, is disclosed.

According to another aspect of the present invention, an apparatus comprising: an interface configured to receive interference level information from a first cellular telecommunication system, the interference level information describing levels of interference between neighboring cells of the first cellular telecommunication system; and a controller configured to utilize the received interference level information in interference control, wherein communication links in a second cellular telecommunication system are controlled so as to control interference towards a target cell, is disclosed.

According to another aspect of the present invention, an apparatus, comprising: reception means configured to receive interference level information from a first cellular telecommunication system, the interference level information describing levels of interference between neighboring cells of the first cellular telecommunication system; and controller means configured to utilize the received interference level information in interference control, wherein communication links in a second cellular telecommunication system are controlled so as to control interference towards a target cell, is disclosed.

According to yet another aspect of the present invention, a computer program product embodied on a computer readable distribution medium as specified in claim 30, is disclosed.

Embodiments of the invention are defined in the dependent claims.

LIST OF DRAWINGS

Embodiments of the present invention are described below, by way of example only, with reference to the accompanying drawings, in which FIG. 1 illustrates a cellular network of a cellular telecommunication system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only, applies to a single embodiment. Single features of different embodiments may also be combined to provide other embodiments.

Figure 1:
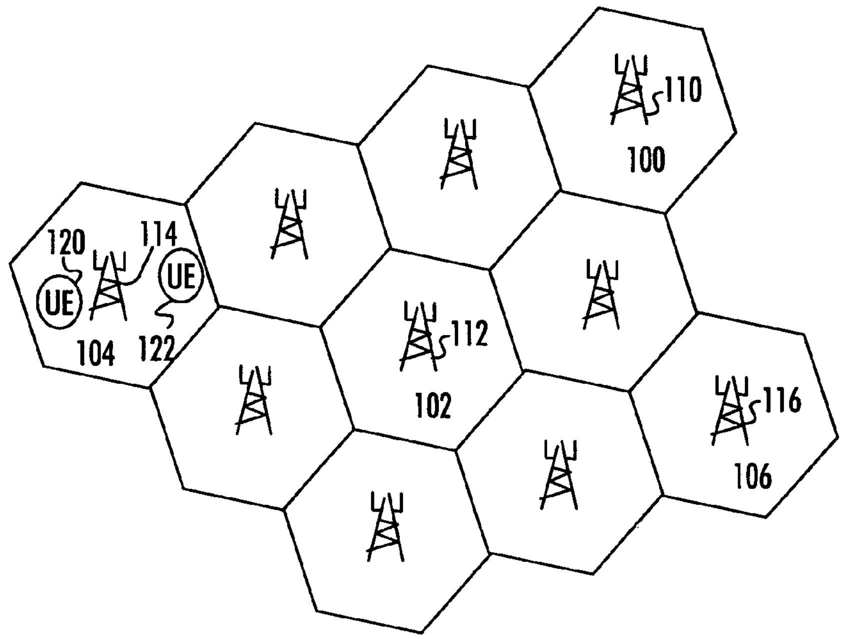

A general architecture of a cellular telecommunication system providing voice and data transfer services to mobile terminals is illustrated in FIG. 1. FIG. 1 illustrates the cellular topology of the cellular telecommunication system where base stations 110 to 116 provide communication link to within their respective coverage areas known as cells 100 to 106. For instance, a mobile terminal 120 located in a cell 104 is served by a base station 114 associated with the cell 104. When the mobile terminal 120 moves from the cell 104 to another neighboring cell, the communication link is handed over to a base station associated with the cell the mobile terminal 120 enters.

The topology, i.e. the cellular structure, of a radio access network of the cellular telecommunication system may have been designed for a second generation cellular telecommunication system, such as the GSM (Global System for Mobile communications), GPRS (General Packet Radio service), and EDGE (Enhanced Data rates for GSM Evolution). However, an operator often utilizes the planned topology for a next generation cellular telecommunication system to avoid unnecessary work in the network design phase. Accordingly, the operator may arrange the next generation cellular telecommunication system to use the same base station sites and cell structures for both second and third generation cellular telecommunication systems. As a consequence, each base station 110 to 116 illustrated in FIG. 1 may include a base station transceiver for the second generation cellular telecommunication system and a base station transceiver for the third generation cellular telecommunication system. In other words, the base stations of the second and third generation cellular telecommunication systems are co-sited and, thus, have the same cellular structure. The third generation cellular telecommunication system may be the UMTS (Universal Mobile Telecommunication System) or one of its evolution versions. A long-term evolution version of the UMTS utilizes OFDMA (orthogonal frequency division multiple access) for downlink communications and SC-FDMA (single carrier frequency division multiple access) for uplink communications. Additionally, the embodiments of the invention may be applied to WIMAX (Worldwide Interoperability for Microwave Access) systems based on IEEE 802.16 standard.

Figure 3:
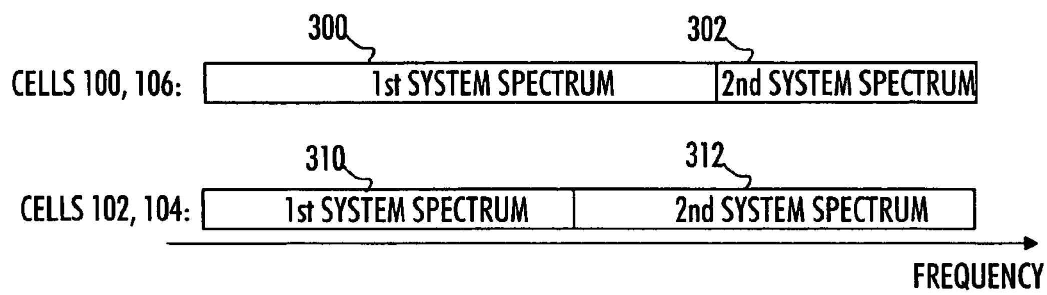
FIG. 3 illustrates frequency resource allocation to a first and a second cellular telecommunication system in cells illustrated in FIG. 1.

From now on, the second generation cellular telecommunication system will be referred to as a first cellular system, and the third generation cellular telecommunication system will be referred to as a second cellular system. Naturally, the two cellular telecommunication systems are not bound to be second and third generation systems but they can be any two cellular telecommunication systems having co-sited base stations. FIG. 3 illustrates exemplary frequency allocation in cells 100 to 106 of FIG. 1. In cells 100 and 106, the same frequency band 300 is allocated to the first cellular system because the cells 100 and 106 are not adjacent cells. A frequency band 302 remaining from the frequency spectrum available for the operator is allocated to the second cellular system in cells 100 and 106. Similarly, the same frequency band 310 is allocated to the first cellular system in cells 102 and 104, and a frequency band 312 remaining from the frequency spectrum available for the operator is allocated to the second cellular system. In this, example, the frequency band 312 allocated to the second cellular system in cells 102 and 104 overlaps partially with the frequency band 300 allocated to the first cellular system in cells 100 and 106. As a consequence, the systems may cause inter-system interference to each other. As the second cellular system is considered as more tolerant for interference than the first cellular system, it is here assumed that the interference from the second cellular system towards the first cellular system is the interference that has to be controlled in order to prevent degradation of quality of services provided by the first cellular system in cells 100 and 106. Naturally, the interference from the first cellular system towards the second cellular system may also be controlled according to embodiments of the invention.

Figure 2:
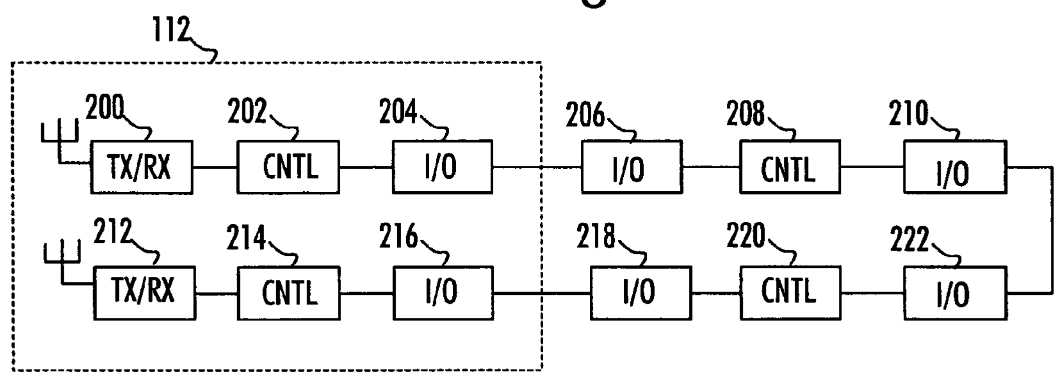
FIG. 2 illustrates as a block diagram the generic structure of two cellular telecommunication systems and communication connection between the two systems.

According to an embodiment of the invention, an interference controller of the second cellular system may utilize interference properties calculated in the first cellular system for controlling the interference towards the first cellular system. Accordingly, the interference controller of the second cellular system may have a communication connection with the first cellular system so as to enable acquisition of the interference properties from the first cellular system. FIG. 2 illustrates a block diagram including the structure of the base station 112 of FIG. 1 and communication connections between the first and second cellular systems.

Referring to FIG. 2, the base station transceiver of the first cellular system of the base station 112 may include a first communication unit 200 configured to provide a radio interface connection with mobile terminals served by a first cellular part of the base station 112 according to specifications of the first cellular system. The first communication unit 200 may be configured to perform analog operations for signals transmitted and received by the first base station transceiver of the base station 112.

The first base station transceiver of the base station 112 may further comprise a processing unit 202 configured to perform digital operations for the signals transmitted and received by the first base station transceiver. The processing unit 202 may further be configured to control operations of the first base station transceiver. The processing unit may be configured by software, or the processing unit may be implemented by an ASIC (Application-specific integrated circuit), for example. In FIG. 2, the processing unit 202 has been illustrated as a single logical entity, but the processing unit may include a plurality of processing units controlling different operations carried out in the first base station transceiver.

The first base station transceiver of the base station 112 may further comprise an interface 204 to provide a communication connection towards other elements of the radio access network of the first cellular system. The interface may provide the first base station transceiver with a communication connection to a base station controller, for example.

The base station controller of the first cellular system is illustrated in FIG. 2 as having a communication interface 206 enabling the communication connection with the first base station transceiver of the base station 112, a processing unit 208 implementing the base station control entity, and a second communication interface 210 to enable a communication connection with the second cellular system. The processing unit 208 may control the operation of a plurality of base station transceivers of the first cellular system and allocate transmission resources to the base station transceivers. The processing unit 208 may be configured to estimate interference levels between the neighboring cells of the 2G system and calculate a matrix representation including information on mutual interference levels between neighboring cell pairs. The matrix representation may be a background interference matrix (BIM) known in public GSM systems, and it may have the form illustrated in Table 1 below. In Table 1, only cells 100 to 106 are considered for the sake of simplicity. In practice, the matrix may include a higher number of neighboring cells and their mutual interference levels.

TABLE 1

| Cell ID | 100 | 102 | 104 | 106 |
|---|---|---|---|---|
| 100 | — | 50 | 60 | 40 |
| 102 | 90 | — | 55 | 50 |
| 104 | 80 | 85 | — | 65 |
| 106 | 40 | 50 | 55 | — |

Table 1 indicates the degree of interference between pairs of cells 100 to 106 such that a higher number indicates higher degree if interference. In Table 1, each interference value indicates the estimated level of interference a cell defined by the vertical axis causes to a cell defined by the horizontal axis. For example, interference from cell 102 to cell 100 is 90, thereby being higher than interference from cell 102 to cell 106, which is 50. The actual values in the BIM may be scaled values. As known with respect to the GSM system, the BIM may be formed on the basis of neighboring cell level measurement reports provided by the mobile terminals. As known in the art, mobile terminals monitor signal levels of broadcast signals transmitted by base stations (on a broadcast control channel, BCCH) for the purposes of handover and frequency channel allocation, and report the detected reception signal levels to the base station controller via a serving base station. The base station controller then estimates interference between the cells from the received measurement reports and constructs the BIM. The BIM may be updated (recalculated) a few times in a day, for example.

As mentioned above, the second communication interface 210 provides the base station controller with the communication link to the interference controller of the second cellular system. The base station controller may transmit the interference level information, e.g. the BIM, to the interference controller of the second cellular system through the second communication interface 210. The interference controller illustrated in FIG. 2 includes a first interface 222 to enable a communication link with the base station controller (and other base station controllers) of the first cellular system, a processing unit 220 forming the functional entity of the interference controller, and a second interface 218 to enable a communication connection with a second transceiver part of the base station 112. The processing unit 220 may be configured to control radio resources and transmission parameters allocated to the second transceiver of the base station according to the specifications of the second cellular system. In more detail, the processing unit 220 may be configured to utilize the received interference level information in interference control by controlling communication links provided by the second transceiver part of the base station so as to reduce interference caused by the second transceiver towards a given target cell. The interference control according to this embodiment will be described in more detail below. The operation of the processing unit 220 may be configured by software, or it may be an ASIC dedicated for controlling interference according to the received interference level information. It should be noted that the invention is not limited by the physical implementation of the processing unit 220.

The second transceiver part of the base station 112 includes an interface 216 to enable a communication connection with the interference controller through the second interface 218 of the interference controller, a processing unit 214 controlling the operation of the second transceiver, and a communication unit 212 to provide a communication connection between the second transceiver and mobile terminals served by the second transceiver.

In the example illustrated in FIG. 2, the interference controller is described as an entity which is external to the second transceiver part of the base station. In such a case, the interference controller may be a centralized interference controller controlling radio resources and transmission parameters of a plurality of base station transceivers of the second cellular system. In such a case, the interference controller may be implemented as a part of a radio resource controller of the radio access network of the second cellular telecommunication system. In another embodiment, the interference controller is implemented in the second transceiver part of each base station, including base stations 110 to 116. As a consequence, the processing units 220 and 214 illustrated in FIG. 2 may be combined and interfaces 216 and 218 omitted. In this embodiment, the functionalities of the interference controller are implemented in each second base station, e.g. base station 110 to 116. Accordingly, each interference controller controls a single base station.

Figure 4:
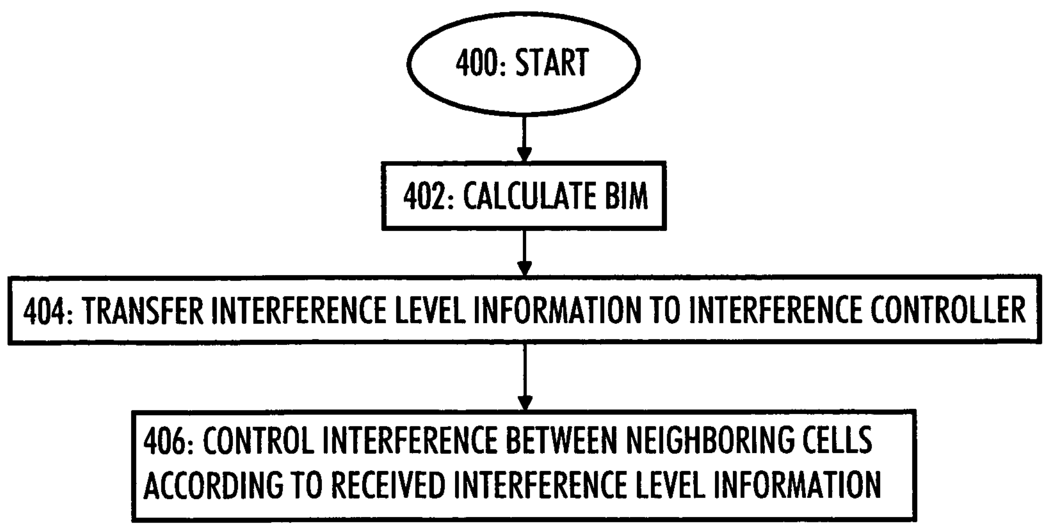
FIG. 4 is a flow diagram illustrating an embodiment of a process for interference control according to an embodiment of the invention.

Let us now consider a general concept of interference control according to an embodiment of the invention with reference to FIG. 4. FIG. 4 is a flow diagram illustrating a process for interference control on the basis of the interference level information received from another cellular telecommunication system. As an example, let us use the first and second cellular telecommunication systems described above. In the embodiments described below, the interference controller of the second cellular system uses the BIM calculated by the base station controller of the first cellular system as the interference level information.

The process starts in block 400. In block 402, the base station controller calculates the BIM from neighboring cell measurement reports received from mobile terminals served by one or more base stations under the control of the base station controller. Each measurement report may include reception power levels of signals transmitted by neighboring base stations. This information is received periodically from mobile terminals, and the base station controller collects the measurement reports from the mobile terminals and constructs the BIM by combining and weighting the received measurement reports according to an algorithm. With respect to the interference control according to an embodiment of the invention, the BIM contains information on mutual interference levels between neighboring cells in case the cells have overlapping frequency bands. In other words, two cells do not necessarily interfere with each other in this embodiment even if the BIM indicates high interference between the cells, if the cells do not have overlapping frequency bands. Let us now assume that the BIM calculated by the base station controller has contents of Table 1 above.

In block 404, the BIM is transferred from the base station controller to the interference Controller of the second cellular system through a communication connection established between the first cellular system and second cellular system. In block 406, the interference controller of the second cellular system analyzes the received BIM and performs interference control so as to control interference caused by communication links in one or more cells of the second cellular system towards neighboring cells. The aim of the interference control according to the embodiments of the invention may be to control inter-system interference between the first and second cellular systems and/or intercell interference in the second cellular system. In an embodiment of the invention, the interference controller controls the communication links in the second cellular system such that the communication links do not degrade the performance of the neighboring cells, i.e. the interference controller takes pre-emptive measures to prevent interference from occurring between neighboring cells. In an alternative embodiment, the interference controller may initiate an interference control procedure so as to reduce interference towards a target cell in response to detecting potentially high interference towards the target cell from the BIM or in response to a request to reduce interference towards the target cell. The request may be originated from the target cell itself or from the base station controller, for example. In other words, one purpose of the interference control according to embodiments of the invention is to control interference levels beforehand, i.e. to prevent the interference levels from ever rising so high that they degrade the quality of communications. Another feature is that the interference is controlled upon occurrence of high interference in the target cell.

Figure 5:
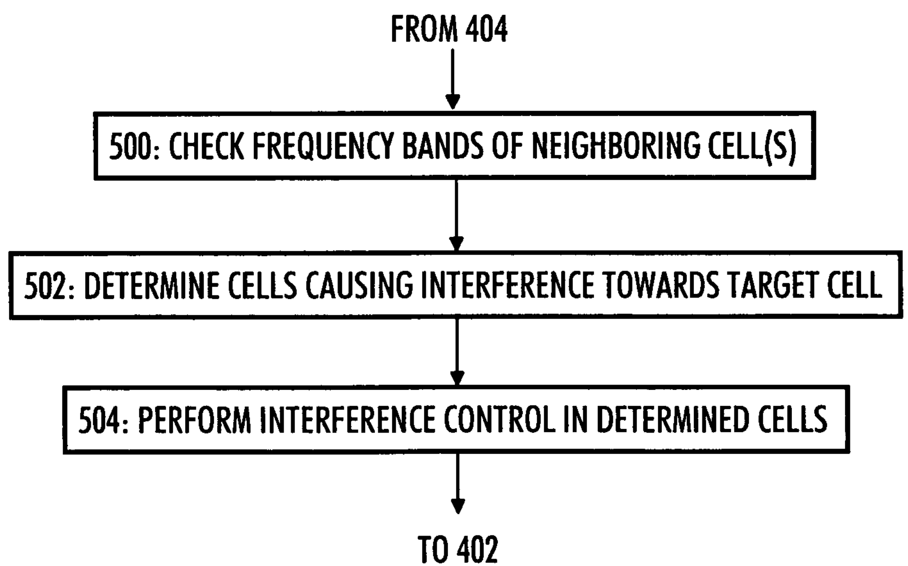
FIG. 5 is a flow diagram illustrating an embodiment of a more detailed process for interference control.

FIG. 5 is a flow diagram illustrating the execution of block 406 of FIG. 4 in more detail. In block, 500, the interference controller checks frequency bands of neighboring cells in order to determine whether there are overlapping frequency bands. In more detail, the interference controller may check whether there are frequency bands in which frequency bands of a first and second cellular systems overlap with each other in neighboring cells. In a case of two neighboring cells having overlapping frequency bands, the cells potentially interfere with each other. For the purpose of determining the overlapping frequency band, the interference controller may store frequency allocation information on frequency bands allocated to first and second cellular systems in the neighboring cells.

In the present example, Table 2 below illustrating the overlapping frequency bands may be formed from the frequency allocation illustrated in FIG. 3. Table 2 illustrates whether the first cellular system and the second cellular system of different cells have been allocated with the same frequency band or a portion of the frequency band. The knowledge of frequency bands allocated to the first cellular system and the second cellular system in the neighboring cells may be stored beforehand in a memory unit of the interference controller.

TABLE 2

| Cell ID | 100 | 102 | 104 | 106 |
|---|---|---|---|---|
| 100 | — | Yes | Yes | No |
| 102 | Yes | — | No | Yes |
| 104 | Yes | No | — | Yes |
| 106 | No | Yes | Yes | — |

In block 502, the interference controller detects from Table 2 that a target cell 100 (first cellular system) has been allocated with a frequency band which overlaps with frequency bands allocated to the second cellular system of the interfering cells 102 and 104. Accordingly, the interference controller deduces that the target cell 100 may suffer from inter-system interference unless taken into consideration for interference control purposes.

Then, the interference controller controls communication links in cells 102 and 104 so as to control the inter-system interference towards the target cell 100 which was determined to have a frequency band of the first cellular system overlapping with frequency bands of the interfering cells of the second cellular system. The interference control is performed in block 504. The inter-system interference may be controlled, for example, by controlling transmit power levels of communication links in the interfering cells 102 and 104 and/or controlling utilization of the overlapping frequency band.

In order to reduce the inter-system interference, the interference controller may decrease the transmit power level and restrict utilization of the overlapping frequency band. The reduction of the transmit power level typically results in lower data rates, i.e. data rates of the communication connections may be reduced so as to decrease the transmit power levels. With respect to the reduction of transmit power levels, the interference controller may control the interfering cells to reduce uplink and/or downlink transmit power levels by a certain degree which may be a function of the interference level from the cell 102 and/or 104 towards the target cell, indicated by the BIM. This may be applied to both established and new communication links in the interfering cells 102 and 104. With respect to the restriction of the utilization of the overlapping frequency band, the interference controller may allocate new communication connection to the frequency band(s) not overlapping with the frequency band allocated to the first cellular system in the target cell 100. Additionally (or alternatively), the interference controller may reallocate at least some of the established communication links to the frequency band(s) not overlapping with the frequency band allocated to the first cellular system in the target cell 100.

Blocks 502 and 504 may be applied to each cell having a frequency band of the second cellular system overlapping with a frequency band of a neighboring cell of the first cellular system.

Let us consider block 504 when establishing a new communication link in the second cellular system in one of the cells 102 and 104. Upon reception of a resource allocation request, the interference controller may check the utilization of a frequency band not overlapping with the frequency band of the first cellular system in cell 100. If the non-overlapping frequency band is available for allocation, the interference controller may allocate that frequency band for use in the communication link. If the interference controller has to allocate the overlapping frequency band to the communication link, the interference controller may first check the BIM and current interference level to determine the degree of interference towards the target cell 100. If the interference level does not exceed an allowable interference level, the interference controller allocates a frequency band from the overlapping frequency band to the communication link. However, the interference controller may apply a different transmit power control on the overlapping frequency band than the transmit power control on the non-overlapping frequency band. For example, the interference controller may apply a lower maximum transmit power level to the overlapping frequency band.

Accordingly, the interference controller may calculate from the BIM for each cell of the second cellular system a maximum allowed amount of traffic on the frequency band which overlaps with a frequency band of a cell or cells of the first cellular system. Then, the interference controller may monitor the amount of traffic and signal levels on the overlapping frequency band with respect to the maximum allowed amount of traffic and ensure that the maximum amount of traffic is not exceeded, i.e. the allowed interference level is not exceeded.

As a consequence, the interference controller according to the embodiment of the invention utilizes interference information received from another cellular telecommunication system in order to control inter-system interference between the cellular telecommunication system the interference controller controls and the other cellular telecommunication system from which the interference information is received. Therefore, the interference controller does not have to estimate the inter-system interference, but it can use the interference information calculated by the other cellular telecommunication system. The interference information may have to be calculated in any case for other purposes, such as the BIM calculated for radio resource allocation, in the other cellular telecommunication system. As a consequence, the inter-system interference control reduces complexity of the inter-system interference control by utilizing existing interference information.

Figure 6:
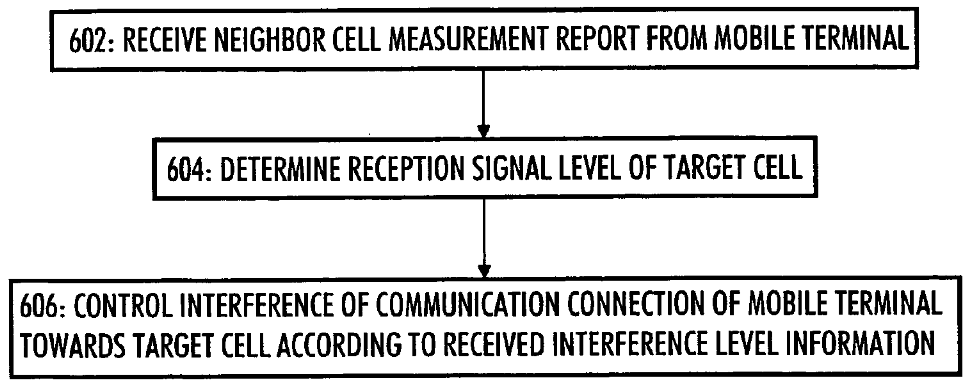
FIG. 6 is a flow diagram illustrating an embodiment of a process for interference control.

The embodiment described above may be used for inter-system interference control at a cell level, or the embodiment may be applied to interference control of a group of connections in the cell interfering the target cell. In another embodiment of the invention, the inter-system interference control is implemented in the interference controller at a connection level by utilizing neighboring cell measurement reports of mobile terminals to supplement the received interference level information. FIG. 6 illustrates a flow diagram describing a process for controlling the inter-system interference according to this embodiment of the invention. The process may be executed in conjunction with the process illustrated in FIG. 5. This embodiment is not, however, limited to the use with the specific embodiment described above with reference to FIG. 5. The embodiment may be used for controlling individual connections in a cell determined to cause inter-system interference towards the target cell. Accordingly, the process according to this embodiment may be carried out in block 406 of FIG. 4.

Let us still consider the case described above with reference to FIGS. 1 and 3 and Tables 1 and 2. Accordingly, the cell 104 has a frequency band of the second cellular system overlapping with the frequency band of the first cellular system of the target cell 100. Accordingly, connections in the cell 104 has to be controlled so as to control interference towards the target cell. Referring to FIG. 1, mobile terminals 120 and 122 are located in the cell 104, i.e. they are served by the base station 114 and, particularly, by the second transceiver of the base station 114.

In block 602, the interference controller receives one or more neighbor cell measurement reports from the mobile terminals 120 and 122 located in the cell 104 The measurement reports may be measurement reports used for handover purposes, in which a mobile terminal indicates reception signal levels of a broadcast signal received from neighboring base stations. The measurement reports may have the contents included in Tables 3 and 4 below. Table 3 illustrates the measurement report of a first mobile terminal 120, and Table 4 illustrates the measurement report of a second mobile terminal 122.

TABLE 3

| Measurement report of mobile terminal 120 | | | |
|---|---|---|---|
| | Cell ID | | |
| | 100 | 102 | 106 |
| Measured signal level [dB] | −110 | −100 | −85 |

TABLE 4

| Measurement report of mobile terminal 122 | | | |
|---|---|---|---|
| | Cell ID | | |
| | 100 | 102 | 106 |
| Measured signal level [dB] | −90 | −105 | −85 |

In this process, the interference controller is particularly interested in the reception signal level received by the mobile terminals from the target cell 100. In block 604, the interference controller extracts and determines the reception signal level of the target cell from the received one or more measurement reports. The interference controller may determine the reception signal level of the target cell from one measurement report only, or the interference controller may average the reception signal levels of a plurality of consecutive measurement reports so as to improve the accuracy of the reception signal level. With reference to Tables 3 and 4, the first mobile terminal 120 receives from the target cell, 100 a signal having a level of −110 dB, while the second mobile terminal 122 receives from the target cell 100 a signal having a level of −90 dB. The second terminal 122 located closer to the target cell 100 in this case receives from the target cell 100 a signal having considerably higher level than that of the first mobile terminal 120 (20 dB difference). Accordingly, the interference controller determines that the interference caused by the second mobile terminal 122 towards the target cell 100 should be controlled and controls in block 606 the communication connection between the base station 114 and the mobile terminal so as to reduce the interference the connection causes. The interference control of the communication connection may be performed as described above, e.g. by reducing transmit power levels and/or reallocating radio resources of the connection. Naturally, the same procedure may be implemented in case the second mobile terminal establishes a new communication connection.

On the other hand, the interference controller determines from the measurement reports received from the first mobile terminal 120 that the first mobile terminal 120 receives from the target base station 100 such a low-level signal that it is probable the first mobile terminal 120 causes no significant interference towards the target cell 100. Accordingly, the interference controller may determine to change no parameters of a communication connection associated with the first mobile terminal 100. Similarly, the interference controller may control individual communication connections in the cell determined to potentially cause interference towards the target cell. The interference controller may determine mobile terminals causing interference towards the target cell from the measurement reports received from the mobile terminals and control the communication connection of the determined mobile terminals so as to keep the interference towards the target cell at a desired level. The interference controller may determine the mobile terminals whose communication connection should be controlled so as to reduce the interference towards the target cell by selecting a number of mobile terminals indicating highest reception signal levels from the target cell or by comparing the reception signal levels related to the target cell with a threshold and selecting mobile terminals indicating reception signal level higher than the threshold. Naturally, other methods may be used for determining the mobile terminals causing the highest interference from the received measurement reports.

Figure 7:
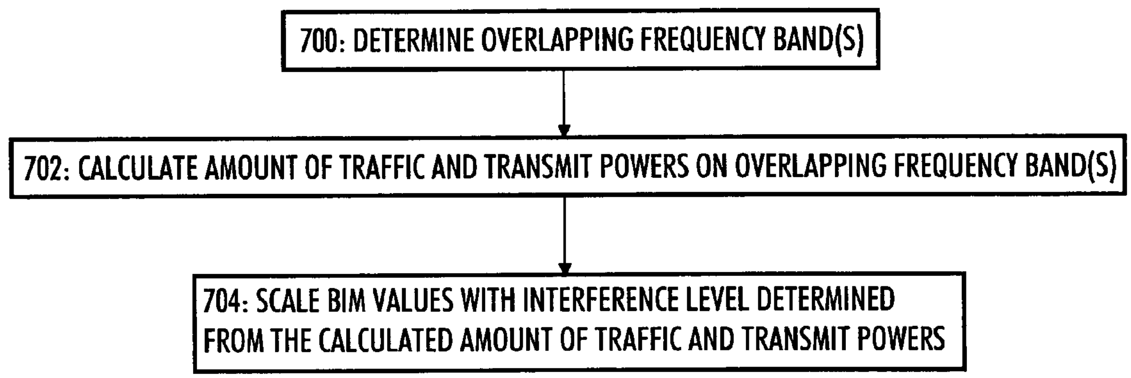
FIG. 7 is a flow diagram illustrating an embodiment of a process for improving the performance of the interference control.

In another embodiment, the interference controller may use the BIM to control interference caused by downlink transmission and the measurement reports received from the mobile terminals to control interference caused by uplink transmission. In other words, the interference controller may control the transmission parameters and radio resources of a base station transmitter of an interfering cell, i.e. cell of the second cellular system having a frequency band overlapping with a frequency band of a cell of the first cellular system, according to the BIM and control transmission parameters and radio resources of a mobile terminal transmitter according to the measurement reports received from the mobile terminal transmitter. Referring to Tables 1, 2, and 3, the BIM in Table 1 indicates that cell 104 potentially causes interference towards cell 100 (the target cell), Table 2 indicates that at least part of the interference is inter-system interference, while the measurement reports of the first mobile terminal 120 in Table 3 indicate that the mobile terminal receives a very low-level signal from the target cell 100. Accordingly, the interference controller may determine from the BIM that the downlink transmission causes interference towards the target cell, while the uplink transmission of the first mobile terminal 120 does not. Accordingly, the interference controller may control the transmission parameters, e.g. transmit power level, and/or radio resources of the second transceiver of the base station 114 of the cell 104 so as to minimize interference caused by the downlink communication towards the target cell. On the other hand, the interference controller may allocate transmission parameters and radio resources related to the uplink communications without concerning of interference towards the target cell. In other words, the interference controller may control the first Mobile terminal to use the transmission parameters and radio resources without any limitation related to the inter-system interference. As another example, let us refer to Tables 1, 2, and 4 in relation to the second mobile terminal 122 residing in the same cell 104. Tables 1 and 2 indicate again that the cell 104 causes interference towards cell 100 (the target cell) and that at least part of the interference is inter-system interference, while the measurement reports of the second mobile terminal 122 in Table 4 indicate that the second mobile terminal 122 receives a high-level signal from the target cell 100. Accordingly, the interference controller may determine from the BIM that the downlink transmission causes interference towards the target cell 100 as does the uplink transmission of the second mobile terminal 122. Accordingly, the interference controller may control the transmission parameters, e.g. transmit power level, and/or radio resources of both second transceiver of the base station 114 of the cell 104 and the second mobile terminal 122 so as to minimize interference caused by the respective downlink and uplink communications towards the target cell. In another embodiment, the interference controller may measure traffic load in frequency bands overlapping between the first cellular system and second cellular system in different cells and scale the values of the BIM accordingly to improve the accuracy of the interference estimates in the BIM or, in general, interference information received from the first cellular system. Referring to FIG. 7, the interference controller determines in block 700 whether there is inter-system interference between a cell of the first cellular system and a cell of the second cellular system and, if there is, an overlapping frequency band in which the frequency band of the first cellular system overlaps with the frequency band of the first cellular system.

Then, the interference controller calculates the level of interference, i.e. combined power of signals in the overlapping frequency band of the cell of the second cellular system in block 702. For that purpose, the interference controller may calculate or estimate amount of data (or data rates) and/or transmit power levels of connections to which there is allocated radio resources from the overlapping frequency band. In practice, the interference controller may use the bandwidths and the transmit powers of connections in the overlapping frequency band to calculate the signal energy (or power) in the overlapping frequency band. Finally, the interference controller may scale (or combine) the corresponding value in the BIM with the calculated level of interference in block 704. The interference controller may find a scaling value matching the calculated level of interference so as to bring the scales of the calculated level of interference and the interference value in the BIM to correspond to each other and, then, scale the BIM value with the scaling value. The scaling values for different interference levels may be stored in a memory unit of the interference controller beforehand.

Figure 8:
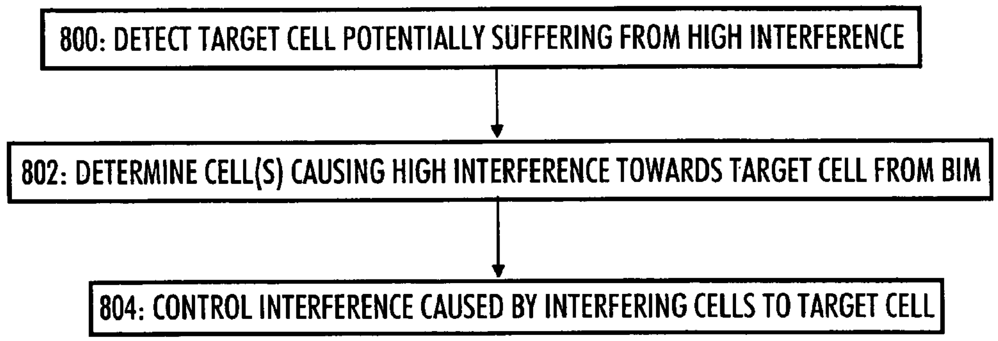
FIG. 8 is a flow diagram illustrating an embodiment of a process for inter-cell interference control.

Above, the interference controller controls one or more communication links in cells of the second cellular system to control inter-system interference towards a target cell of the first cellular system by utilizing the interference information received from the first cellular system. In another embodiment of the invention, the interference controller controls inter-cell interference in the second cellular system by utilizing the interference information received from the first cellular system. In this embodiment, the target cell suffering from high interference is a cell of the second cellular system, and the source of the interference is another cell (or cells) of the second cellular system. The interference information received from the first cellular system may be used for inter-cell power control in the second cellular system, for example. A flow diagram of FIG. 8 illustrates a process for controlling inter-cell interference in the second cellular system according to this embodiment. Referring to FIG. 8, the interference controller detects in block 800 that a target cell of the second cellular system suffers from high interference. The interference controller may detect the potential for high interference towards the target cell directly from the contents of the BIM received from the first cellular system, or the target cell may transmit to the interference controller a notification of high interference and an instruction to reduce the interference towards the target cell. Referring to Table 1, let us now assume that the target cell is cell 102. In block 802, the interference controller determines from the BIM the cells causing the highest interference towards the target cell 102. The frequency bands of the cells may also be checked, but it may also be omitted, if the second cellular system utilizes frequency reuse factor of one. The interference controller detects from the BIM in Table 1 that cell 104 causes the highest interference towards the target cell 102, unless interference control is performed. In block 804, the interference controller controls the transmit power levels in the interfering cell 104 so as to so as to minimize interference towards the target cell 102. The transmit power control may be applied to both new and established connections. Since the cells are allocated with the same frequency bands, the interference controller may choose not to reallocate the frequency resources.

As mentioned above, the target cell may transmit to the interference controller the notification of high interference and the instruction to reduce the interference towards the target cell. The target cell may also be provided with the BIM and, upon detection of degraded performance because of high external interference, a processing unit of the target cell may analyze the BIM to detect a number of neighboring cells causing the highest interference. Then, the processing unit of the target cell may transmit to interference controller(s) controlling the cells determined to cause the highest interference the notification of high interference and the instruction to reduce the interference towards the target cell. Accordingly, the instruction to reduce the interference towards the target cell is transmitted only to the cells determined to cause the highest interference and not to the other cells, thereby reducing unnecessary signaling and performance degradation in cells not causing any significant interference towards the target cell. Additionally, the target cell may transmit the notification of high interference and the instruction to reduce the interference towards the target cell to the cells of the first cellular system, if the target cell detects from the BIM and from the frequency resource allocation table (Table 2) that the cells of the first cellular system may also be the source of interference. In such a case, the BIM is used also for inter-system power control in which the base station(s) or the base station controller of the first cellular system reduces transmit power levels in the cells indicated by the target cell so as to reduce interference towards the target cell of the second cellular system.

Let us consider a case where a cell causes both inter-system interference and inter-cell interference towards a target cell. In such a case, if an interference controller controlling the cell interfering the target cell controls inter-system interference and inter-cell interference independently, the interference controller may end up reducing transmit power levels and/or restricting radio resources such that the grade of service in the interfering cell degrades more than is necessary to reduce the interference to an allowable level. If the interference controller detects that a cell is causing both inter-system interference and inter-cell interference towards the target cell, the interference system may first perform the interference control with respect to one type of interference and then check whether the interference control reduces the interference sufficiently also with respect to the other type of interference. For instance, the interference controller may first consider the inter-system interference and calculate interference control parameters from the received interference information (BIM, for example). Let us consider simple transmit power control parameters for simplicity. The interference controller may calculate how much the transmit powers should be reduced in the cell to reduce the interference towards the target cell to a sufficient level and then control the transmitters in the cell to reduce their transmit powers to such level. Then, the interference controller may consider the inter-cell interference by determining, whether the transmit power level reduction reduces the inter-cell interference towards the target cell to a tolerable level. If not, the interference controller may further reduce the transmit power levels in the cell. On the other hand, if the transmit power level reduction reduces the inter-cell interference towards the target cell to a tolerable level, the interference controller may determined not to further reduce the transmit power levels in order not to degrade the grade of service in the cell unnecessarily.

When the inter-cell power control according to embodiments of the invention is applied to the long-term evolution version of the UMTS, inter-cell power control commands between cells may be implemented by using an overload indicator transmitted to neighboring cells by a base station requesting the neighboring cells to reduce their transmit power levels. The overload indicator may be transmitted to the neighboring base stations over an X2 interface established between the base stations.

The processes or methods described in FIGS. 4 to 8 may also be carried out in the form of a computer process defined by a computer program. The computer program may be in source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The cellular telecommunication system may have a fixed infrastructure providing wireless services to subscriber terminals and having the same cellular structure as another cellular telecommunication system from. The protocols used, the specifications of mobile telecommunication systems, their network elements and subscriber terminals, develop rapidly. Such development may require extra changes to the described embodiments. Therefore, all words and expressions should be interpreted broadly and they are intended to illustrate, not to restrict, the embodiment.

It will be obvious to a person skilled in the art that, as technology advances, the inventive concept can, be implemented in various ways. The invention and its embodiments are not limited to the examples described above but may vary within the scope of the claims.

The invention claimed is:

1. A method, comprising:

receiving, from a first cellular telecommunication system in an interference controller of a second cellular telecommunication system, interference level information describing levels of interference between neighboring cells of the first cellular telecommunication system; and utilizing, by the interference controller, the received interference level information in interference control, wherein communication links in the second cellular telecommunication system are controlled so as to control interference towards a target cell.

2. The method of claim 1, wherein the cells of the first cellular telecommunication system and the second cellular telecommunication system are co-sited and the method further comprises:

using the interference level information received from the first cellular telecommunication system in inter-cell power control of the second cellular telecommunication system.

3. The method of claim 1, further comprising:

determining from the interference level information received from the first cellular telecommunication system at least one cell causing an inter-cell interference towards the target cell;

controlling transmit power levels in the at least one cell determined as causing the inter-cell interference towards the target cell;

wherein the interference level information received from the first cellular telecommunication system is a background interference matrix comprising information on estimated mutual interference between a number of neighboring cell pairs; and wherein the background interference matrix is calculated from a neighboring cell level measurement data received from mobile terminals of the first cellular telecommunication system.

4. The method of claim 2, wherein the target cell is a cell of the first cellular telecommunication system and wherein radio access networks of the first cellular telecommunication system and the second cellular telecommunication system share at least partly a same frequency band, the method further comprising:

determining, by the interference controller from the received interference level information, at least one cell of the second cellular telecommunication system potentially causing inter-system interference towards the target cell; and controlling, by the interference controller, transmission related to communication links in the determined at least one cell so as to control the interference towards the target cell.

5. The method of claim 4, wherein the determining the at least one cell of the second cellular telecommunication system potentially causing the inter-system interference is based at least in part on: the received interference level information, from frequency bands allocated to the target cell, and cells of the second cellular telecommunication system neighboring the target cell;

the method further comprising:

determining that a given cell of the second cellular telecommunication system does not cause inter-system interference towards the target cell regardless of the interference level information, if the cell of the second cellular telecommunication system is assigned with a different frequency band than the frequency band of the target cell; and determining that a given cell of the second cellular telecommunication system causes inter-system interference towards the target cell, if the cell of the second cellular telecommunication system is assigned with at least partly the same frequency band as the frequency band of the target cell and if the interference level information indicates that the cell causes interference level higher than a threshold towards the target cell.

6. The method of claim 5, further comprising:

receiving neighboring cell level measurement reports from terminals of the second cellular telecommunication system, wherein the terminals are located in a cell of the second cellular telecommunication system and the neighboring cell level measurement reports comprise reception levels of signals received from the target cell by the terminals; and utilizing both reception levels related to the target cell and the received interference level information when controlling interference the communication links in the cell cause towards the target cell so as to improve the accuracy of an estimate of the interference the communication links in the cell of the second cellular telecommunication system causes towards the target cell.

7. The method of claim 6, further comprising:

using the received interference level information to determine a level of downlink inter-system interference towards the target cell and using the reception levels related to the target cell to determine a level of uplink inter-system interference towards the target cell; and controlling downlink transmission related to communication links in the second cellular telecommunication system according to the determined level of the downlink inter-system interference towards the target cell and uplink transmission related to communication links in the second cellular telecommunication system according to the determined level of the uplink inter-system interference towards the target cell.

8. The method of claim 7, further comprising:

calculating signal power on a frequency band allocated to a given cell of the second cellular telecommunication system, wherein the frequency band in question is common with the cell of the second cellular telecommunication system and the target cell;

combining the calculated signal power with the received interference level information so as to improve the accuracy of the estimate of the interference the cell of the second cellular telecommunication system causes towards the target cell; and calculating the signal power on the frequency band allocated to the cell of the second cellular telecommunication system from an amount of traffic in the cell on the frequency band and from transmission power levels of communication links causing the traffic on the frequency band.

9. The method of claim 8, further comprising:

controlling the transmission related to communication links in the second cellular telecommunication system by at least one of the following:

controlling transmission power levels of at least a portion of the communication links, and controlling utilization of a frequency band overlapping with a frequency band allocated to the target cell.

10. An apparatus comprising:

an interface configured to receive interference level information from a first cellular telecommunication system, the interference level information describing levels of interference between neighboring cells of the first cellular telecommunication system, and a controller configured to utilize the received interference level information in interference control, wherein communication links in a second cellular telecommunication system are controlled so as to control interference towards a target cell.

11. The apparatus of claim 10, wherein the cells of the first cellular telecommunication system and the second cellular telecommunication system are co-sited.

12. The apparatus of claim 10, wherein the controller is further configured to use the interference level information received from the first cellular telecommunication system in inter-cell power control of the first cellular telecommunication system.

13. The apparatus of claim 10, wherein the controller is further configured to:

determine from the interference level information received from the first cellular telecommunication system at least one cell causing an inter-cell interference towards the target cell;

control transmit power levels in the at least one cell determined as causing the inter-cell interference towards the target cell;

wherein the interference level information received from the first cellular telecommunication system is a background interference matrix comprising information on estimated mutual interference between a number of neighboring cell pairs; and wherein the background interference matrix is calculated from a neighboring cell level measurement data received from mobile terminals of the first cellular telecommunication system.

14. The apparatus of claim 11, wherein the target cell is a cell of the first cellular telecommunication system and wherein radio access networks of the first cellular telecommunication system and the second cellular telecommunication system share at least partly a same frequency band, and the controller is further configured to determine from the received interference level information at least one cell of the second cellular telecommunication system potentially causing inter-system interference towards the target cell and to control transmission related to communication links in the determined at least one cell so as to control interference towards the target cell.

15. The apparatus of claim 14, wherein the controller is further configured to:

determine the at least one cell of the second cellular telecommunication system potentially causing the inter-system interference based at least in part on the received interference level information, frequency bands allocated to the target cell and to cells of the second cellular telecommunication system neighboring the target cell;

determine that a given cell of the second cellular telecommunication system does not cause inter-system interference towards the target cell regardless of the interference level information, if the cell of the second cellular telecommunication system is assigned with a different frequency band than the frequency band of the target cell, and determine that a given cell of the second cellular telecommunication system causes inter-system interference towards the target cell, if the cell of the second cellular telecommunication system is assigned with at least partly the same frequency band as the frequency band of the target cell and if the interference level information indicates that the cell causes interference level higher than a threshold towards the target cell.

16. The apparatus of 15, wherein the controller is further configured:

to receive, through the interface, neighboring cell level measurement reports from terminals of the second cellular telecommunication system, wherein the terminals are located in a cell of the second cellular telecommunication system and the neighboring cell level measurement reports comprise reception levels of signals received from the target cell by the terminals, and to utilize reception levels related to the target cell and the received interference level information when controlling interference caused by communication links in the cell towards the target cell so as to improve the accuracy of an estimate of the interference the communication links in the cell of the second cellular telecommunication system causes towards the target cell.

17. The apparatus of claim 16, wherein the controller is further configured to use the received interference level information to determine a level of downlink inter-system interference towards the target cell and the reception levels related to the target cell to determine a level of uplink inter-system interference towards the target cell, and to control downlink transmission related to communication links in the second cellular telecommunication system according to the determined level of the downlink inter-system interference towards the target cell and uplink transmission related to communication links in the second cellular telecommunication system according to the determined level of the uplink inter-system interference towards the target cell.

18. The apparatus of claim 17, wherein the controller is further configured to:

calculate signal power on a frequency band allocated to a given cell of the second cellular telecommunication system, wherein the frequency band in question is common with the cell of the second cellular telecommunication system and the target cell;

combine the calculated signal power with the received interference level information so as to improve the accuracy of the estimate of the interference the cell of the second cellular telecommunication system causes towards the target cell;

calculate the signal power on the frequency band allocated to the cell of the second cellular telecommunication system from an amount of traffic in the cell on the frequency band and from transmission power levels of communication links causing the traffic on the frequency band.

19. The apparatus of claim 18, wherein the controller is further configured to control the transmission related to communication links in the second cellular telecommunication system by at least one of the following:

controlling transmission power levels of at least a portion of the communication links, and controlling utilization of a frequency band overlapping with a frequency band allocated to the target cell.

20. An interference controller, comprising:

at least one processor; and at least one memory including non-transitory computer program code;

the at least one memory and the computer program code configured to, with the at least one processor, cause the interference controller to perform at least the following:

receive, from a first cellular telecommunication system in the interference controller of a second cellular telecommunication system, interference level information, the interference level information describing levels of interference between neighboring cells of the first cellular telecommunication system;

utilize, by the interference controller, the received interference level information in interference control, wherein communication links in the second cellular telecommunication system are controlled so as to control interference towards a target cell.

* * * * *